June 8, 1937.  A. PRABELL  2,082,973
BAKEPAN UNIT
Filed April 9, 1936
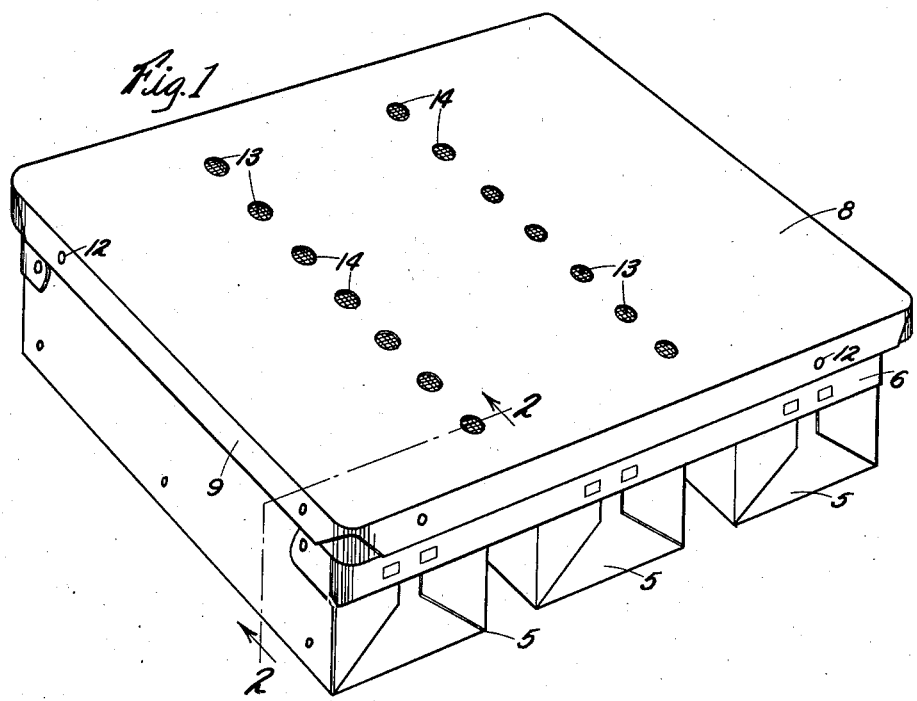
INVENTOR.
Albert Prabell
BY Murray and Zugelter
ATTORNEYS Patented June 8, 1937

2,082,973

UNITED STATES PATENT OFFICE 2,082,973

BAKEPAN UNIT

Albert Prabell, Bellevue, Ky., assignor to The Lockwood Manufacturing Company, Cincinnati, Ohio., a corporation of Ohio Application April 9, 1936, Serial No. 73,495

9 Claims. (Cl. 53—6)

This invention relates to a baking pan unit and a cover therefor adapted particularly for use in the baking of sandwich bread.

An object of the invention is to provide a cover of sufficient weight to resist displacement by rising of bread in the pan and constructed with means to preclude hardening of the top portions of the bread by contact with the body of the cover.

Another object is to provide means adapted to be readily associated with covers for sandwich bread pans, which means are adapted to preclude the formation of a tough upper crust baked in the pans.

Another object is to provide means of the kind described which are adapted for efficient manufacture and prolonged use.

These and other objects are attained by the means described herein and illustrated in the accompanying drawing, in which:

Fig. 1 is a perspective view of a unit of sandwich bread pans provided with the cover means of this invention.

Fig. 2 is a cross sectional view taken on line 2—2 of Fig. 1.

Figs. 3 and 4 are fragmental perspective views of modified forms of the cover of this invention.

In the baking of sandwich bread, there has heretofore been a disadvantage resulting from the use of the pan covers commonly employed in units of this kind. This disadvantage has consisted of a hardening and thickening of the top portions of the loaves due to contact of the loaves with the heavy covers referred to, which covers, as is well understood in the art, are employed for the purpose of producing square loaves. The production of this tough top crust on the loaves has probably been due to a combination of circumstances in which prolonged contact of the risen dough with the hot and heavy metal covers and likewise with condensation formed on the inner surface of the covers, seem to have been the chief factors. In addition to these factors may be mentioned the fact that the covers commonly employed are of greater thickness than the metal of the pans themselves, in order to resist the displacement, as already described, but which added weight of the covers has resulted in a greater concentration of heat at the top of the loaves. In any case, these disadvantages have been universally noted heretofore and the present invention provides means for overcoming them.

The present invention consists briefly in the provision, on the inner surface of the cover, of a screen against which the rising loaves contact so that they are prevented from touching the body proper of the cover whereby the hardening and thickening of the crust, as already described, is obviated.

In greater detail and with reference to the drawing, the present invention contemplates the use of a sandwich bread pan 5, or a unit of them, joined as in Fig. 1, by suitable strap means 6. It will be observed in Fig. 2, that each pan is provided with perpendicular sides, so that together with the cover the pans are adapted to produce sandwich loaves, that is, loaves that are square in cross section. The pans 5 may be formed with suitably rolled and reinforced top edges 7 (Fig. 2).

The cover of the present invention consists of a body 8, preferably of a relatively heavy metal and provided with lateral flanges 9 adapted to embrace the top portions of the bakepan, as in Fig. 2. The flanges 9 may be formed by a reinforcing band 10 extending around the edges of the body 8 of the cover and embraced by the edge portions 11 of said body which, after being turned about the reinforcing band 10, are suitably secured thereto such as by rivets 12 or other suitable means. The body 8 of the cover may be provided with rows of perforations 14 adapted to register with the spaces between the pans of the unit.

Covering the inner surface of the body 8 in accordance with the present invention is a liner 13 which may be a screen, a perforate sheet or plain. This liner, as seen in Fig. 2, may have its edge portions engaged between the reinforcing band 10 and the embracing portions 11 of the cover body 8. The liner thus positioned serves as a spacer. It will be seen in Fig. 2 that a space 19 is provided between the liner and the body of the cover. The liner precludes contact of the rising bread in the pans with the body 8 of the cover and thereby precludes the hardening of the upper crust of the loaves, as previously described.

In Fig. 3, instead of the screen such as the one illustrated in Fig. 2, the cover may be provided with a metal sheet 15 provided throughout all its surface with a plurality of perforations 16. This sheet 15 may be secured to the body of the cover in a manner similar to that illustrated in Fig. 2.

Instead of a screen or perforate sheet the liner may likewise be a plain sheet, as previously suggested.

In Fig. 4 the screen 17, instead of extending within the side flanges of the cover, terminates at the flanges and is secured to the body at the cover by means of rivets 18 or similar attachment means. This modification of the invention may obviously be readily effected upon pre-existing covers of the older type with which it may be desired to associate the improvements provided by the present invention.

The use of the present invention has proved highly effective for the purposes described and it is obvious that the construction is of such simplicity as to add little to the manufacturing methods heretofore followed. The perforate sheets or screens provided by the present invention, inasmuch as they are in a comparatively protected position within the covers, are adapted for prolonged periods of use.

What is claimed is:

1. A cover for a baking pan and comprising a body and a perforate liner covering the inner surface of the body, and precluding contact of the top of the bread with the body of the cover whereby hardening of said portions of the bread is avoided.

2. A cover for a baking pan and comprising a body formed of a metal sheet, a reinforcing band extending around the edges of the body to provide flanges therefor, the edge portions of the body embracing and secured to said band, and a perforate sheet covering the inner surface of said body and having its edge portions secured between said band and the band-embracing portions of said cover, said perforate sheet precluding contact of the top of the bread with the body of the cover whereby hardening of said portions of the bread is avoided.

3. A cover for a baking pan and of sufficient weight to resist displacement by bread rising in the pan, the cover comprising a metal body, a reinforcing band extending around the edges of the body to provide flanges therefor, the edge portions of the body embracing and secured to said band, and a screen covering the inner surface of said body and having its edge portions secured between said band and the band-embracing portions of said cover, said perforate sheet precluding contact of the top of the bread with the body of the cover whereby hardening of said portions of the bread is avoided.

4. A cover for a baking pan and of sufficient weight to resist displacement by bread rising in the pan, the cover comprising a body provided with edge flanges adapted to embrace the top edge portions of the pan, and a screen covering the inner surface of said body and precluding contact of the top of the bread with the body of the cover whereby hardening of said portions of the bread is avoided.

5. The combination with a bread pan of a cover comprising a body and a perforate liner covering the inner surface of the body and precluding contact of the top of the bread with the body of the cover whereby hardening of said portions of the bread is avoided.

6. The combination with a bread pan of a cover of sufficient weight to resist displacement by bread rising in the pan, said cover comprising a body, and a perforate liner covering the inner surface of the body and precluding contact of the top of the bread with the body of the cover whereby hardening of said portions of the bread is avoided.

7. The combination with a bread pan, of a cover of sufficient weight to resist displacement by rising of bread in the pan, said cover comprising a body formed of a metal sheet, a reinforcing band extending around the edges of the body to provide flanges therefor, the edge portions of the body embracing and secured to said band, and a perforate sheet covering the inner surface of said body and having its edge portions secured between said band and the band-embracing portions of said cover, said perforate sheet precluding contact of the top of the bread with the body of the cover whereby hardening of said portions of the bread is avoided.

8. The combination with a unit of sandwich bread pans, of a cover of sufficient weight to resist displacement by bread rising in the pans, said cover comprising a relatively heavy metal body, a reinforcing band extending around the edges of the body to provide flanges therefor, the edge portions of the body embracing and secured to said band, and a perforate sheet covering the inner surface of said body and having its edge portions secured between said band and the band-embracing portions of said cover, said perforate sheet precluding contact of the top of the bread with the body of the cover whereby hardening of said portions of the bread is avoided.

9. The combination with a unit of sandwich bread pans, of a cover of sufficient weight to resist displacement by bread rising in the pan, the cover comprising a body provided with edge flanges adapted to embrace the top edge portions of the pan, and a screen covering the inner surface of said body and precluding contact of the top of the bread with the body of the cover whereby hardening of said portions of the bread is avoided.

ALBERT PRABELL.